May 7, 1968   M. A. VAN HORN, JR   3,382,023
MULTIPLE APERTURE ROOF PRISM
Filed Sept. 21, 1964   3 Sheets-Sheet 1

INVENTOR.
MILTON A. VAN HORN
BY John F. McDevitt
ATTORNEY

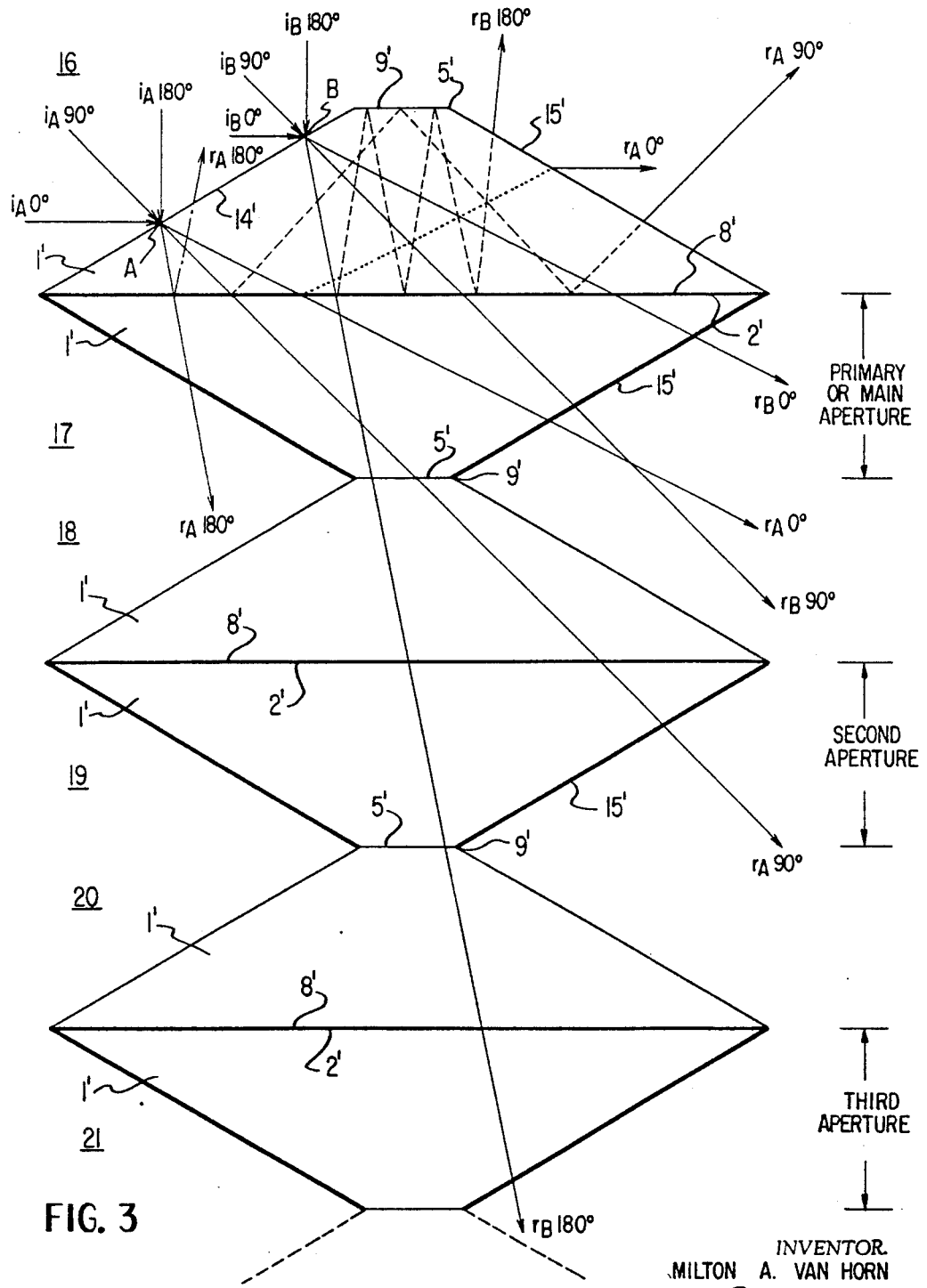

May 7, 1968   M. A. VAN HORN, JR   3,382,023
MULTIPLE APERTURE ROOF PRISM
Filed Sept. 21, 1964   3 Sheets-Sheet 3

INVENTOR.
MILTON A. VAN HORN
BY *John F. McDuirt*
ATTORNEY

United States Patent Office
3,382,023
Patented May 7, 1968

3,382,023
MULTIPLE APERTURE ROOF PRISM
Milton A. Van Horn, Jr., Clarks Summit, Pa., assignor to General Electric Company, a corporation of New York
Filed Sept. 21, 1964, Ser. No. 397,856
2 Claims. (Cl. 350—286)

ABSTRACT OF THE DISCLOSURE

Four identical roof-prism elements are assembled in abutting relationship with the same roof edge in each element extending along a common line which forms the central viewing axis of the composite member. The individual prism elements have sloping end faces intersecting with the central viewing axis at a common acute angle and four side faces extending between said end faces which intersect to provide two oppositely disposed roof edges. The side faces are made optically reflective to produce a secondary aperture effect in the prism.

---

This invention relates generally to an improved roof prism and, more particularly, to an improved roof prism construction for use in a wide range scanner.

In the past use has been made of optical prisms to transmit a light image and to vary the line of sight of an optical system by moving only the prism. While single and double Dove prism scanning elements were suitable in a single plane, their usefulness was limited because of their inability to scan along another axis. To provide complete hemispherical scanning and to increase the field of view of the prism, the prism structure described in the copending application of Brunelle, Jr., et al., S.N. 334,154, filed Dec. 30, 1963 and now Patent No. 3,320,019, assigned to the same assignee as this application, was originated. In the prism of that application four roof prism elements are placed in a composite system with the central edges of the roofs placed along a central axis of the composite prism, and the roof planes of each element are placed abutting the roof planes of adjacent roof prism elements. This composite prism arrangement provides a complete hemispherical scan and a much larger instantaneous field of view. However, even in this composite prism system there is a loss of aperture size and a vignetting effect at the limits of the scanning range. To obviate this difficulty the present invention involves the utilization of multiple internal reflection to create successive secondary apertures as the main aperture begins to disappear. The secondary apertures act as extensions of the primary aperture and greatly increase the effective size of the actual aperture.

Therefore, it is an object of this invention to provide a roof prism construction in which vignetting of the image as the scan limits are reached is greatly reduced.

It is another object of the present invention to provide a roof prism construction in which there is reduced loss of size of the effective aperture at the limits of the scanning operation.

It is yet another object of this invention to reduce vignetting of the image of a roof prism as the scan limits are reached by producing a succession of a secondary apertures.

Figure 1:
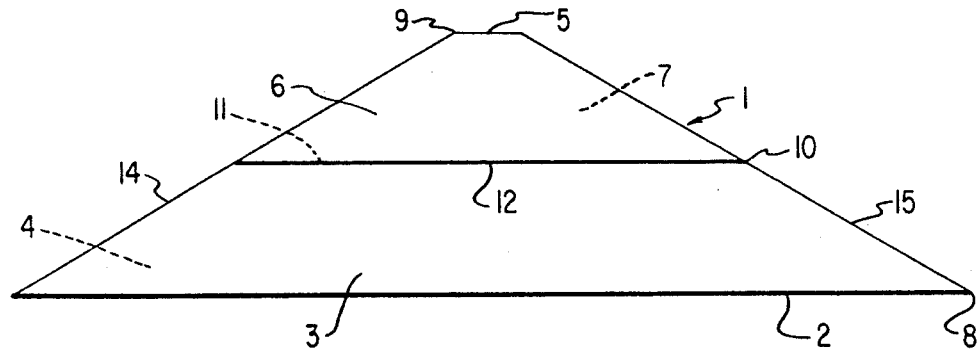
Figure 2:
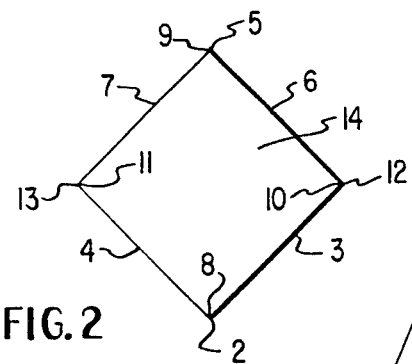
Figure 4:
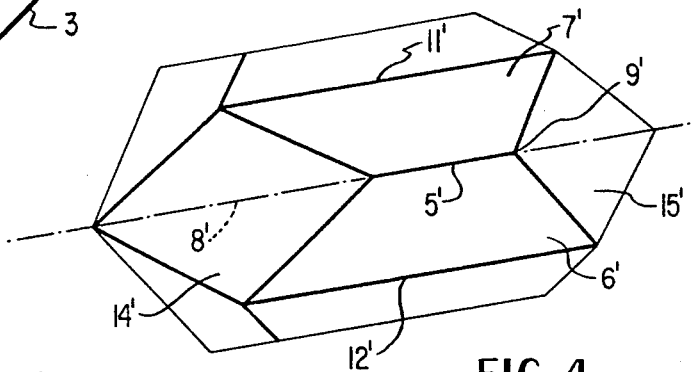
Figure 5:
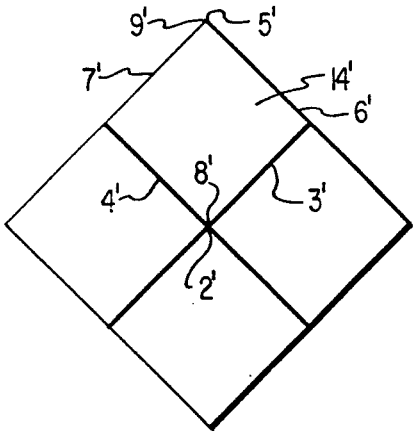
Figure 6:
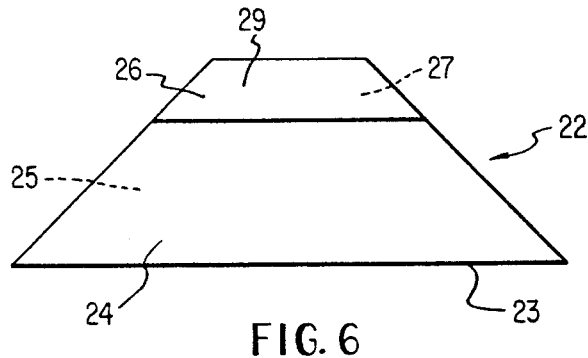
Figure 7:
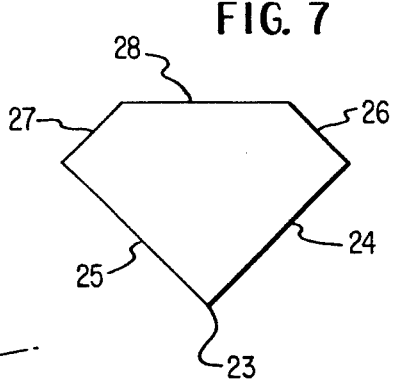
Figure 8:
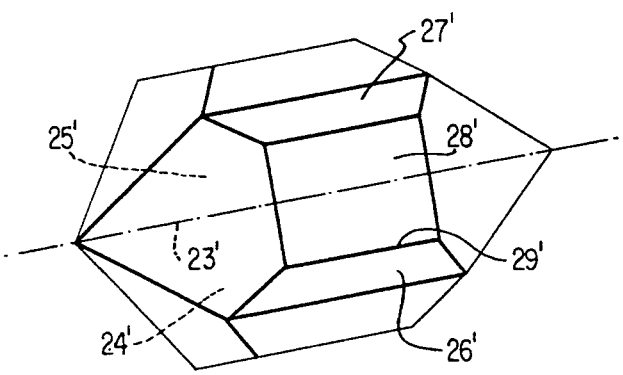
Figure 9:
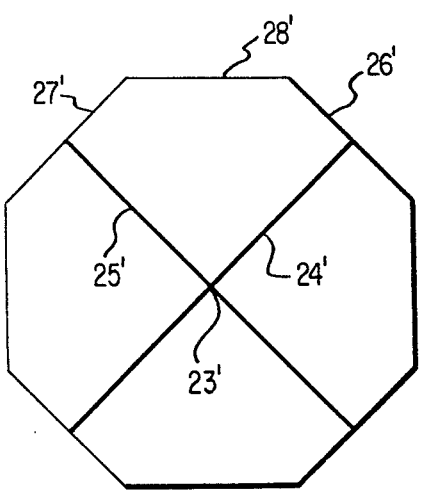

These and other important objects of the invention will become apparent from the following detailed description taken in connection with the accompanying drawings in which:

FIGURE 1 is a side view of a single prism element;
FIGURE 2 is an end view of the single prism element of FIGURE 1;
FIGURE 3 is a tunnel diagram illustrating the secondary aperture effect;
FIGURE 4 is a perspective view of a composite prism formed from four prism elements;
FIGURE 5 is an end view of the composite prism of FIGURE 4;
FIGURE 6 is a side view of a second type of single prism element;
FIGURE 7 is an end view of the single prism element of FIGURE 6;
FIGURE 8 is a perspective view of a composite prism formed from four of the prism elements shown in FIGURES 6 and 7; and
FIGURE 9 is an end view of the composite prism of FIGURE 8.

Briefly, in one form thereof, this invention consists of replacing the upper portion of a roof prism element by a reflecting roof, or a portion of a reflecting roof. The basic structure of such prism elements is that shown in the aforementioned copending application of Brunelle, Jr., et al., but the additional roof-shaped sections of the elements of Brunnelle, Jr., et al., do not form reflecting roofs, the feature which constitutes the present invention. The additional roof is formed by polishing and coating the existing surfaces or faces of the prism elements shown in the copending Brunelle, Jr., et al., application. The optical characteristics of these prism elements having four reflecting surfaces or faces are such that as the prism is rotated to the point where the main aperture begins to disappear a secondary aperture will appear to act as an extension of the main aperture. Thus, the scanning capabilities of the roof prism are greatly increased. By placing these individual roof prisms in a composite prism as disclosed in the aforementioned copending application of Brunelle, Jr., et al., a hemispherical scanner may be formed which has reduced vignetting and a greatly decreased loss of aperture as the scanning limits are approached.

A single roof prism element 1, having a longitudinal axis and embodying the concepts of this invention, is illustrated in FIGURES 1 and 2. The main or ordinary reflecting roof 2 of this prism element is formed from reflecting surfaces or side faces 3 and 4. Abutting the conventional roof, with its center edge diagonally opposed so that the roofs are diagonally opposite, there is formed a second roof 5 having reflecting surfaces or side faces 6 and 7. A cross section of this prism has a square shape as may best be seen in the end view of FIGURE 2. Each of the reflecting side faces 3, 4, 6 and 7 are trapezoidal in shape. The trapezoidal reflecting side faces 3 and 4 have the longer of the parallel edges of the trapezoids placed together along the roof edge 8. This edge 8 is also the longest edge of the prism element and is parallel to the longitudinal axis of the prism element.

Trapezoidal reflecting side faces 6 and 7 have the shorter of the parallel edges of the trapezoids placed in abutting relationship along the roof edge 9. This roof edge 9 is also the shortest edge of the prism and is parallel to edge 8 and the longitudinal axis of the element. With the longer parallel edges of reflecting side faces 6 and 7 abutting the shorter parallel edges of reflecting side faces 3 and 4 the intermediate length edges 10 and 11 of the prism are defined.

FIGURE 2 reveals that placing roofs 2 and 5 in abutting relationship also forms additional roofs 12 and 13, roof 12 consisting of reflecting faces 3 and 6 and roof 13 consisting of reflecting faces 4 and 7. Thus, there are actually four reflecting roofs and the edges 10 and 11 are roof edges similar to roof edges 8 and 9.

Light from the images to be observed enters the prism element through end face 14 or end face 15, since the element is bidirectional and may be used in either direction, and is refracted by the optical material of the prism and reflected by roofs 2, 5, 12 and 13 and exits through end face 15 or end face 14, where it is seen by an observer. End faces 14 and 15 are nonparallel and are located at a common acute angle to the longitudinal axis of the prism element.

The exact dimensions and angular relationships of a particular prism will depend upon a balancing of the various factors involved. In one specific example end faces 14 and 15 are placed at an angle of 30° with respect to an axis parallel to roof edges 8, 9, 10 and 11. Reflecting faces 3, 4, 6 and 7 are formed with a width of 15/16 of an inch between parallel edges of the trapezoids. In this particular example roof edge 8 has a length of 4⅞ inches. The edges of end faces 14 and 15 are given a one millimeter bevel to minimize breakage or the formation of jagged edges on the prism.

Of primary importance is the production of reflecting faces to produce multiple internal reflecting faces 3, 4, 6 and 7 are polished and aluminized to provide improved reflection characteristics. To protect the aluminized surfaces a coating such as silicon monoxide may be utilized.

The optical performance of the prism of this invention may be best understood with the aid of the tunnel diagram of FIGURE 3. This tunnel diagram is used only to explain the operation of the prism in a plane that bisects the main roof angle and is perpendicular to both of the end faces. However, this explanation in a single plane is sufficient to illustrate the secondary aperture effect.

In FIGURE 3 the tunnel diagram consists of a series of representations of the roof prism successively displaced 180° from the preceding representation. These representations are purely for analytical purposes and do not depict an actual physical displacement of the element. Successive representations are numbered 16, 17, 18, 19, 20 and 21 for ease of reference.

The description of the operation is most easily understood by utilizing rays incident at A and B at various angles. Incident rays are indicated with small $i$'s while the resultant rays produced by refraction and reflection are indicated with small $r$'s.

Starting with $i_A0°$, which is parallel to the longitudinal axis of the element 1', it is seen that the ray is refracted and leaves through end face 15' of the element 1' as indicated in position 17. It will be noticed that $i_A0°$ intersects roof edge 8' of 1'. In terms of the actual operation this means that the ray impinged upon roof 2' and was reflected through end face 15' of the element 1'. Thus, the representation of any ray passing through face 15' of the element in position 17 indicates that that ray appears through the end face 15' after one reflection and is therefore considered as being part of the primary or main aperture. The actual path of the ray is indicated in position 16 by the dotted line, wherein the single reflection is readily apparent.

In this application the word "aperture" refers to the image area, not the physical input and output areas of the prism elements. Thus, the main aperture is the image area seen when looking through the prism element along its longitudinal axis. The term "secondary apertures" in this application refers to the succession of apertures, or image areas, that appear as the element is rotated.

Moving now to the ray indicated as $i_A90°$ it will be seen that this ray is actually only displaced 45° from $i_A0°$. However, the prism involved here actually gives a scanning capability of twice its actual rotation, so that a rotation of element 1' from a position in which $i_A0°$ was normal to end face 14' to a position where $i_A90°$ is normal to end face 14' would indicate a total scanning movement of 90°. This is the nomenclature that will be followed for all of the rays at both of the points A and B.

Looking now at $i_A90°$ it may be seen that after entering end face 14' it intersects roof edge 8' of element 1' in position 16, roof edge 9' of the element in position 17 and roof edge 8' of the element in position 18 and exits as $r_A90°$ in position 19. At each intersection of the path of the ray with one of the roof edges there is a reflection of the ray, just as was discussed in connection with $i_A0°$. Thus, the large dash line indicates the actual path of the ray in prism element 1'. It may be seen that the dash line shows a reflection from roof 2', a subsequent reflection from roof 5' and a second reflection from roof 2' before exiting from end face 15'. A comparison of the actual path of $i_A90°$ with that illustrated by the tunnel diagram indicates that the tunnel diagram is an excellent method of presenting a visual representation of the optical paths through this roof prism. In the tunnel diagram, each time a ray intersects a roof edge 8' or 9' it is an indication of a reflection, and each time a ray exits from a face 15' in a position such as 17, 19 or 21, it is an indication that the ray will be visible at the exit face of the prism. The relative position of the observer with respect to the exit face determines which set of rays will be seen. This is the basis of the secondary aperture effect, as rays seen in the position 17 will be from the main aperture, rays seen in position 19 will be from the second aperture, etc.

An explanation has been rendered of how a ray is refracted and reflected to appear through the main aperture and the secondary aperture. To make the explanation complete a ray which appears at a following secondary aperture, termed the tertiary aperture, will now be described. Looking at $i_B180°$, it may be seen that the ray intersects roof edge 8' of element 1' in position 16, roof edge 9' of the element in position 17, roof edge 8' of the element in position 18, roof edge 9' of the element in position 19, roof edge 8' of the element in position 20, and exits through end face 15' of the element in position 21. As was discussed above, this indicates that the ray will be seen through the second secondary, or third effective, aperture. The short dash line in element 1' in position 16 indicates the actual reflections that this ray goes through. This path illustrates three reflections from roof 2' and two from roof 5', which is just what the tunnel diagram indicates.

As a further illustration of the meaning of the tunnel diagram, if the ray $i_B180°$ were moved down to point A so that it became $i_A180°$ it may be seen that the ray would then be refracted and exit through face 14' of the element in position 17. The dash-dot line indicates that in actual operation the ray would be reflected at roof edge 8' of element 1' in position 16 and exit through face 14' in position 16, which would mean that it would never appear at the exit aperture.

It should be noted that for each successive secondary aperture the area of face 14' upon which a ray impinges and exits through that particular aperture gets progressively smaller. Therefore, the secondary apertures become progressively smaller because the field of view for which such a secondary aperture effect would be realized is progressively smaller.

Now that the individual rays have been analyzed and traced, it makes possible the comprehension of the secondary apertures produced by these multiple reflections. When the prism is held in the horizontal position as shown in FIGURE 3, and looked into along a longitudinal axis parallel to roof edge 8', only the primary or main aperture will be visible. This is so because only the rays which have been reflected but once are close to being parallel to the longitudinal axis and therefore visible to an eye or an optical device placed along this axis at the exit aperture. However, as the prism is rotated in a clockwise direction from the position shown in FIGURE 3, the rays such as $r_A90°$ will come within range of the eye or optical device which has been held stationary during rotation of the prism. While this rotation of the prism makes the rays which have been reflected three times, such as $r_A90°$, visible to the eye or the optical device, it takes the original rays which were visible out of range of the optical device. Thus, the main aperture begins to disappear but as it disappears a secondary aperture takes its place. Continued rotation of the prism will result in the second aperture moving from view and a third aperture will be brought into view. This succession of secondary apertures theoretically continues through an infinite number of apertures. Practically, however, the operation of the prism would usually be limited to the utilization of the first few secondary apertures which are realized.

Of course, the prism of this invention also provides a secondary aperture effect in planes other than that bisecting the main roof angle and for skew rays, but the analysis of the phenomenon in these other planes and for skew rays is too complex for the simple tunnel diagram. A computer program would be one way of analyzing all of the rays.

To this point only a single roof prism element has been discussed. However, these prisms have their greatest usefulness in a composite prism of the type described and claimed in the aforementioned copending application of Brunelle, Jr., et al. Thus, FIGURES 4 and 5 illustrate how four of these individual roof prisms may be joined together with roof edges 8' along the common axis of the composite prism. This combination of prisms results in the production of a device which will provide complete hemispherical scan with the smallest possible roof prism elements and also provide a reduction in vignetting and in loss of effective aperture as the scanning limits are approached.

The description of this invention has proceeded with reference to a single embodiment, but it should be realized that the invention may be utilized in many other embodiments which are intended to be covered by the claims of this application. An example of another embodiment incorporating the advantages of this invention is depicted in FIGURES 6-9. This particular embodiment has the advantages of being more compact, having less glass and therefore less weight, and providing mounting surfaces.

A single prism element 22 of the second embodiment is shown in FIGURES 6 and 7. The main reflecting roof 23, formed from reflecting side faces 24 and 25 is the same as roof 2 of the embodiment of FIGURES 1 and 2. Reflecting side faces 26 and 27 form a part of a second reflecting roof similar to roof 5 of FIGURES 1 and 2. However as may best be seen in FIGURE 7, side faces 26 and 27 do not extend to form a complete roof, but are terminated in the unpolished face 28. If the side faces 26 and 27 were extended they would form a second roof diagonally opposite the main roof. Due to this factor and the fact that faces 26 and 27 provide the same function as their corresponding portions of side faces 6 and 7, this top section will be termed "roof" 29 for purposes of this application. Also for purposes of this application the roof 29 and 23 will be considered to be diagonally opposite, as are the corresponding roofs 5 and 2 of the embodiment of FIGURES 1 and 2. As in the first embodiment, the formation of a second reflecting roof actually produces additional reflecting roofs. Counting the truncated roof 29 there are four roofs—roofs 23 and 29, the reflecting roof formed by side faces 24 and 26, and the roof formed by side faces 25 and 27.

In operation this embodiment is the same as that of FIGURES 1 and 2, except for the variations of the secondary apertures that are introduced by not extending side faces 26 and 27 until they intersect. These variations of the secondary apertures take the form of reducing the effective aperture size and the possibility of altering the aperture shape. However, these variations, in many applications, are more than offset by the advantages of the lighter, more compact and more easily mounted prism. By removing only a slight portion of the second reflecting roof the ease of mounting could be increased without appreciably affecting the optical characteristics.

FIGURES 8 and 9 illustrate a composite prism scanner, corresponding to that shown in FIGURES 4 and 5, formed from the prism elements of FIGURES 6 and 7. Again the greatest use of these prism elements will probably occur in such a scanning device. While the aforementioned Brunelle, Jr., et al. application sets forth the advantages of the composite prism device, this invention permits even greater use of the scanner of that application.

It is not desired to limit my invention to the particular embodiments shown and described, as one skilled in the art will realize that certain modifications may be made without departing from the true spirit of the invention. Therefore, it is intended to cover all modifications and changes within the spirit and scope of this invention by the appended claims.

What I claim as new and desire to secure by Letters Patent of the United States is:

1. A composite optical prism which comprises four identical roof-prism elements joined together in abutting relationship with one roof edge in each prism element providing a common edge constituting the central viewing axis of the composite prism; each of said roof-prism elements being defined by oppositely sloping planes at opposite ends of the element which intersect the central viewing axis to form a common acute angle in the element between said planes and the central viewing axis, four side faces extending between said sloping planes with a first pair of the side faces forming said one roof edge and a second pair of the side faces forming a second roof edge oppositely disposed from and parallel to said one roof edge, and means for making said four side faces of each prism element optically reflective; whereby intersection of the sloping planes with the central viewing axis at each end of the prism elements is at a common point to provide the entrance and exit apertures of the composite prism.

2. A composite optical prism which comprises four identical roof-prism elements joined together in abutting relationship with one roof edge in each prism element providing a common edge constituting the central viewing axis of the composite prism; each of said roof-prism elements being defined by oppositely sloping planes at opposite ends of the element which intersect the central viewing axis to form a common acute angle in the element between said planes and the central viewing axis, four side faces extending between said sloping planes with a first pair of the side faces forming said one roof edge and a second pair of the side faces forming a second roof edge oppositely disposed and parallel to said one roof edge, all adjacent side faces being at right angles to each other so that the prism element has a square interior cross section and means for making said four side faces of each prism element optically reflective; whereby intersection of the sloping planes with the central viewing axis at each end of the prism elements is at a common point to provide the entrance and exit apertures of the composite prism.

References Cited

UNITED STATES PATENTS

| 2,992,516 | 7/1961 | Norton | 350—96 |
| 3,014,133 | 12/1961 | Speller et al. | 350—286 |
| 3,320,019 | 5/1967 | Brinelle et al. | 350—286 |

FOREIGN PATENTS 628,769    7/1927    France.

DAVID H. RUBIN, *Primary Examiner.*

JEWELL H. PEDERSEN, *Examiner.*

R. J. STERN, *Assistant Examiner.*